Figure 7:
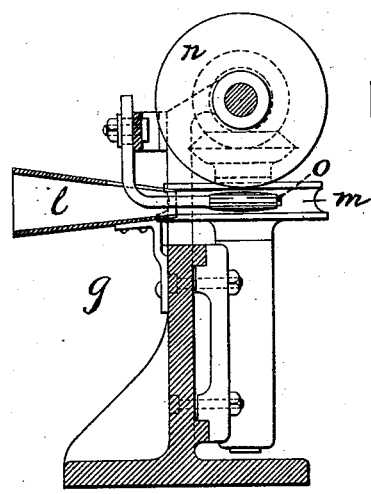

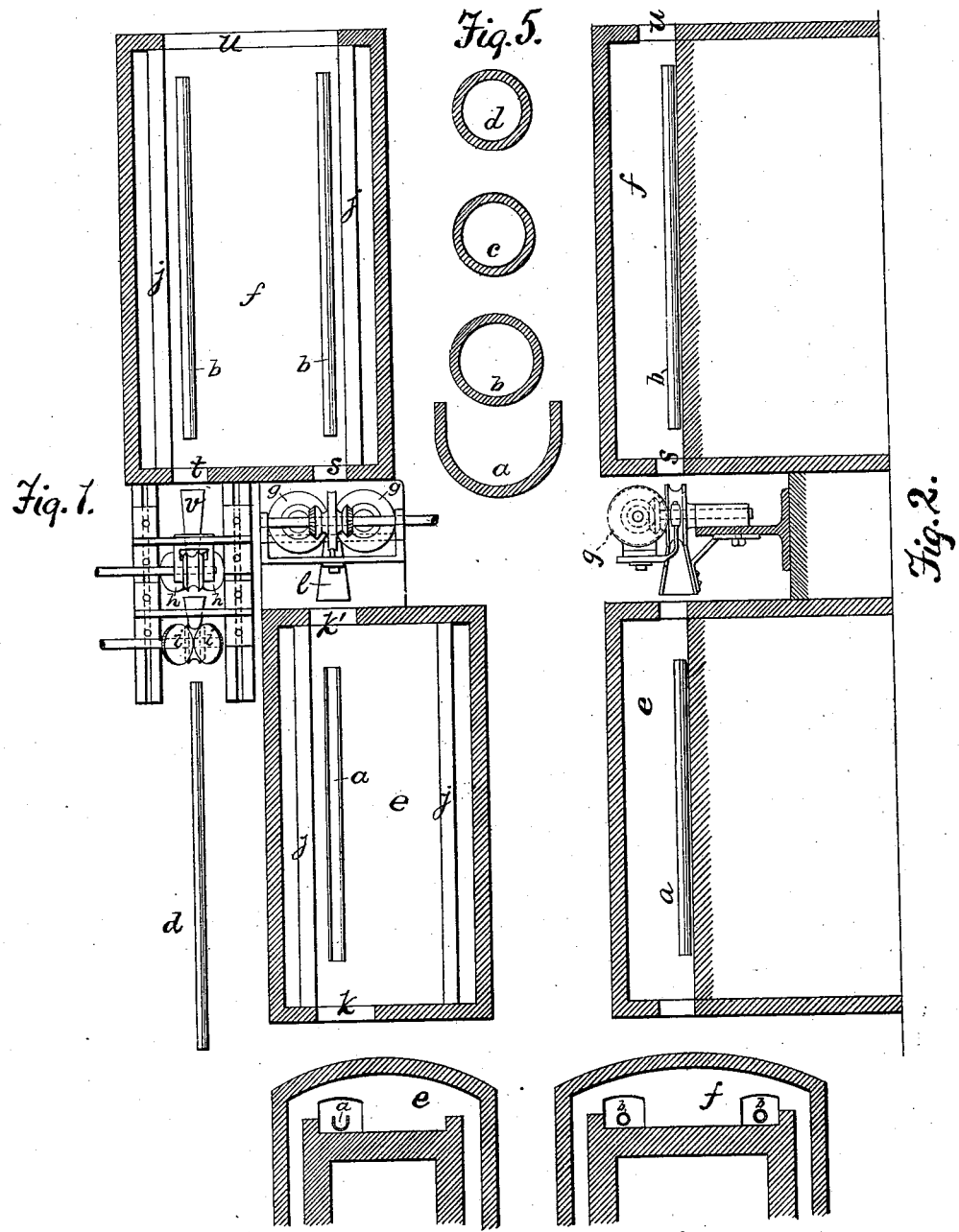

(No Model.) 2 Sheets—Sheet 2.

S. P. M. TASKER.
Method of Welding and Sizing Tubes.

No. 243,471. Patented June 28, 1881.

Attests:
John Tolley
Joshua Pusey

Inventor
Stephen P. M. Tasker.
By his Attorneys,
W. C. Strawbridge,
J. Bonsall Taylor.

500

UNITED STATES PATENT OFFICE.

STEPHEN P. M. TASKER, OF PHILADELPHIA, PENNSYLVANIA.

METHOD OF WELDING AND SIZING TUBES.

SPECIFICATION forming part of Letters Patent No. 243,471, dated June 28, 1881.

Application filed October 7, 1880. (No model.)

*To all whom it may concern:*

Be it known that I, STEPHEN P. M. TASKER, of Philadelphia, Pennsylvania, have invented an Improvement in Continuous Methods of Welding and Sizing Tubes, and in apparatus for carrying out the same, of which the following is a specification.

The object of my invention is to weld and size tubing by a continuous and single operation.

Heretofore in the manufacture of tubing it has either been attempted to first weld a previously-heated partially-bent skelp by means of welding-rolls, and then immediately thereafter, without further heating and in the same apparatus, pass the tube so welded through a succession of smaller rolls, by the action of which latter the metal of the tube is consolidated and the figure of the tube perfected, a welded tube being made at one heat and by one operation; or else it has been the practice to, as a first stage, heat to a welding-heat in a suitable furnace a partially-bent skelp, and then by means of welding-rolls, in conjunction with said furnace, weld said heated skelp into a tube, and, as a second stage, after the tube so welded has cooled and lost its welding-temperature, to either carry it, by a "bogie" or other handling device, to a second furnace not in immediate connection with the first furnace and welding-rolls, or else by means of tube-returning devices to manipulate it back into the same or first furnace in which it was welded, wherein—*i. e.*, either in the distant second furnace or in the first furnace—the welded tube is again heated to a welding-heat; and, lastly, to pass the reheated welded tube through condensing-dies, in connection either with the distant second furnace or with the first furnace, by the action of which dies the tube is consolidated and its figure perfected as a resultant effect of two separate heatings conducted at periods necessarily, by reason of the carrying or manipulation, so long apart that the tube has meanwhile lost its welding-heat, and of two separate operations or manipulations.

I have discovered that better results, both as to product and as to expense, may be attained by making the old process of heating and welding and heating and condensing continuous throughout, and not, as heretofore, in two separate stages, one of heating and welding and one of heating and condensing, and by the employment, in lieu of either the former two separate apparatus and intermediate carrying devices or of the single furnace and manipulating or tube-returning devices, of a single apparatus consisting of a furnace, a welding apparatus, a second furnace, and a condensing apparatus, arranged in close and continuous relation each with the other in such manner that the heated skelp can be passed from the first furnace to the welding apparatus, and direct from the welding apparatus, by the action thereof, into the second furnace, without being allowed to lose its welding-heat, and from said second furnace, without extraneous manipulation, be passed direct into the condensing apparatus, whence said skelp emerges a completely welded and sized tube.

In general terms, my invention consists as follows: Skelp (best previously bent to some such form as that indicated in section by *a* in Figure 5 of the drawings, although not necessarily bent into any invariable form) is first heated to a welding-heat in any suitable furnace, then is caused to emerge direct from the furnace mentioned and pass immediately through any suitable welding apparatus, whereby it is rounded and welded to the form indicated in section by *b* in Fig. 5, and whereby, also, it is carried direct into a second furnace of suitable construction and arrangement, then in said second furnace is retained at its welding-heat, and immediately, without other handling or manipulation than a mere movement in the furnace, caused to pass from out of said second furnace and immediately enter any suitable sizing or reducing and condensing apparatus, whereby the tube is caused to assume any desired diameter—as, for instance, such as are indicated by *c* or *d* in said Fig. 5. The method is wholly continuous, enabling the retention of welding-heat in the tube and obviating all extraneous handling or manipulation. The tube produced is superior to those made by the old methods by reason of the retention of the welding-heat during its making.

For the practice of my invention as above set forth I have devised the following combined apparatus, to which specific apparatus, however, considered as to its separate members, I do not restrict myself, as many welding and many sizing mechanisms and many furnaces other than those represented and described will, when arranged in continuous relation, as described, co-operate to effectuate the invention.

Figure 6:
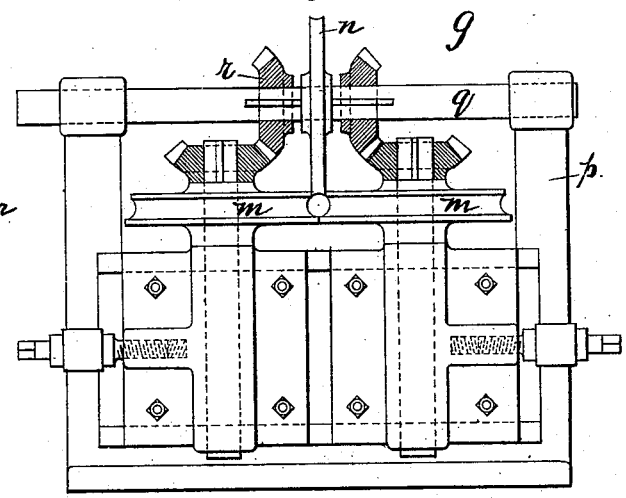
Figure 8:
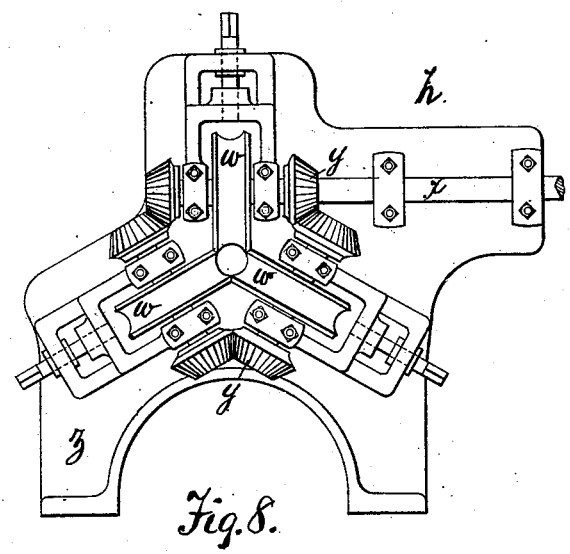

In the accompanying drawings, Fig. 1 is a top-plan view of an apparatus which I find it convenient to employ for the carrying out of my invention, the tops of the furnaces being shown removed; Fig. 2, a central longitudinal vertical section of the apparatus of Fig. 1, viewed from the right-hand side of said Fig. 1; Fig. 3, a partial transverse central sectional elevation of the first furnace; Fig. 4, a similar view of the second furnace; Fig. 5, cross-sectional details of both skelp and tubing of varying diameters; Fig. 6, a front elevation, partially in section, of a convenient arrangement of welding apparatus; Fig. 7, a central side sectional elevation of the welding apparatus of Fig. 6, showing the mandrel in position; Fig. 8, a front elevation of a convenient arrangement of condensing or sizing rolls.

Similar letters of reference indicate corresponding parts in all the figures.

In the drawings, $e$ represents the first furnace, or that into which the skelp (usually bent into the form $a$ of Fig. 5) is introduced to take on its welding-heat. This furnace may be of any well-known construction, and best consists of a hearth for the skelp to lie on, bounded by longitudinal bridge-walls $j$. At both ends there are provided ports $k\ k'$, through one of which, $k$, the skelp is entered, and through the other of which, $k'$, it is passed out and into the welding apparatus.

$g$ represents a welding apparatus of a character invented by me, and patented to me in and by Letters Patent No. 106,295, dated August 9, 1870. The welding apparatus is placed in conjunction with the furnace $e$, the pass of its rolls being in line with the exit-port $k'$ of said furnace, and so close to it that the heated skelp, when forced out from the furnace, emerges directly upon the guide $l$ of the welding-rolls. In brief, this welding apparatus consists in the combination of three grooved rolls, two of which, $m\ m$, run in the same horizontal plane, and are provided with grooves upon their peripheries, while the third, $n$, runs in a plane at right angles to that of the other two, and is also provided with a groove, which, coinciding with those of the first-mentioned rolls, completes the welding-pass of the set. Between the grooves of the rolls is a mandrel, $o$, for giving internal support to the partly-made tube as it passes through the rolls. The rolls are suitably mounted in a housing, $p$, and are driven from a shaft, $q$, by bevel-gearing $r$ or the like.

$f$ is the second furnace, well placed, as shown in the plan view of Fig. 1—that is to say, in the same longitudinal direction with the first furnace, and with its right-hand port, $s$, in line with the pass of the welding-rolls $g$, so that a tube welded by said rolls is fed by them directly upon the hearth of said second furnace. This furnace has two ports, $s$ and $t$, in its front end and a broad opening, $u$, at its back end, through which the tube upon its hearth can be manipulated, turned over, or otherwise transferred from the right to the left hand side of the hearth, (which is bounded by bridge-walls, as in the case of the first furnace,) so as to be brought into line with the discharge-port $t$, through which it is passed out and into the condensing apparatus.

$h\ i$ represent a condensing apparatus of a character invented by me, and patented to me in and by Letters Patent No. 175,522, dated March 28, 1876, reissued June 24, 1879, as No. 8,774. The condensing apparatus is placed at the left-hand front end of and in conjunction with the furnace $f$, as is well shown in Fig. 1, the pass of its rolls being in line with the exit-port $t$ of the furnace $f$, and so close to it that the reheated tube, when forced out from the second furnace, emerges directly upon the guide V of the condensing-rolls. In brief, this condensing apparatus consists in the combination, to form a machine for reducing the diameter of metal tubes, of a series of two or more sets of grooved rolls arranged in the following manner: first, each set consisting of three or more grooved rolls arranged at an angle to each other in such manner that their respective grooves coincide to form the reducing-pass of said set; second, the reducing-pass of each succeeding set being of a less diameter than that of the set immediately preceding throughout the series; and, third, the rolls of each set being so respectively placed that each roll is set out of plane with a corresponding roll in the set immediately preceding. I have represented in Fig. 1 a two-set series, $h\ i$. In Fig. 8 is represented, in elevation, one of these sets, $h$. $w\ w\ w$ are its reducing-rolls, which are driven from a shaft, $x$, by the bevel-gears $y$, the whole arrangement being set in a suitable housing, $z$.

By a regulation of the diameter of the passes of the condensing apparatus the diameter of the tubing can be regulated at will, as it will be understood that by adding additional sets the diameter can be reduced to the desired extent.

Having thus described my invention, I claim and desire to secure by Letters Patent of the United States—

1. The method of welding and sizing tubing herein described, which consists in conducting in a continuous operation, substantially in the manner and for the purposes hereinbefore set forth, the following steps, viz: first, heating skelp to a welding-heat; second, welding said skelp to form a tube; third, heating said welded tube; fourth, condensing said welded tube to any desired diameter.

2. The combination, to form a single apparatus for the continuous welding and sizing of tubing, of a furnace, a welding apparatus, a second furnace, and a condensing apparatus, substantially in the manner shown and described.

In testimony whereof I have hereunto signed my name this 2d day of October, A. D. 1880.

STEPHEN P. M. TASKER.

In presence of—
J. BONSALL TAYLOR,
W. C. STRAWBRIDGE.